United States Patent [19]

Schock et al.

[11] 4,218,422
[45] Aug. 19, 1980

[54] CONVERTER STRUCTURE

[75] Inventors: Donald N. Schock, Riverview; Hans G. Schwallbach, St. Clair Shores, both of Mich.

[73] Assignee: Ford Motor Company, Dearborn, Mich.

[21] Appl. No.: 732,687

[22] Filed: Oct. 15, 1976

[51] Int. Cl.[2] .......................... B01J 8/02; F01N 3/15
[52] U.S. Cl. ....................................... 422/171; 60/307; 422/172
[58] Field of Search ........ 23/288 F, 288 FB, 288 FC, 23/277 C; 60/289, 299, 307; 422/172, 194, 171

[56] References Cited

U.S. PATENT DOCUMENTS

| | | | |
|---|---|---|---|
| 3,307,920 | 3/1967 | Barnes | 23/288 F |
| 3,338,682 | 8/1967 | Fowler et al. | 23/288 F |
| 3,503,714 | 3/1970 | Lang | 23/288 FB |
| 3,915,658 | 10/1975 | Scheitlin et al. | 23/288 FC |
| 3,948,611 | 4/1976 | Stawsky | 23/288 FC |
| 3,969,083 | 7/1976 | Givens et al. | 23/288 FB |
| 3,973,916 | 8/1976 | Shelton | 23/288 FB |
| 4,049,388 | 9/1977 | Scheitlin et al. | 23/288 FB |

*Primary Examiner*—Barry S. Richman
*Attorney, Agent, or Firm*—William E. Johnson; Keith L. Zerschling

[57] ABSTRACT

Device for adding secondary air to a converter structure including a converter housing with inlet and outlet structures attached to opposite ends thereof. A pair of catalyst containing beds are supported within the housing in spaced relationship. The improved device for introducing secondary air in the space between the spaced catalyst containing beds includes structure for forming a restricted throat between the spaced catalyst containing beds and structure forming an annular zone between the structure and the interior surface of the converter housing. The annular zone encircles the restricted throat and is connected thereto by a plurality of openings. A secondary air supply supplies air to the annular zone which can flow through the openings to the restricted throat.

2 Claims, 3 Drawing Figures

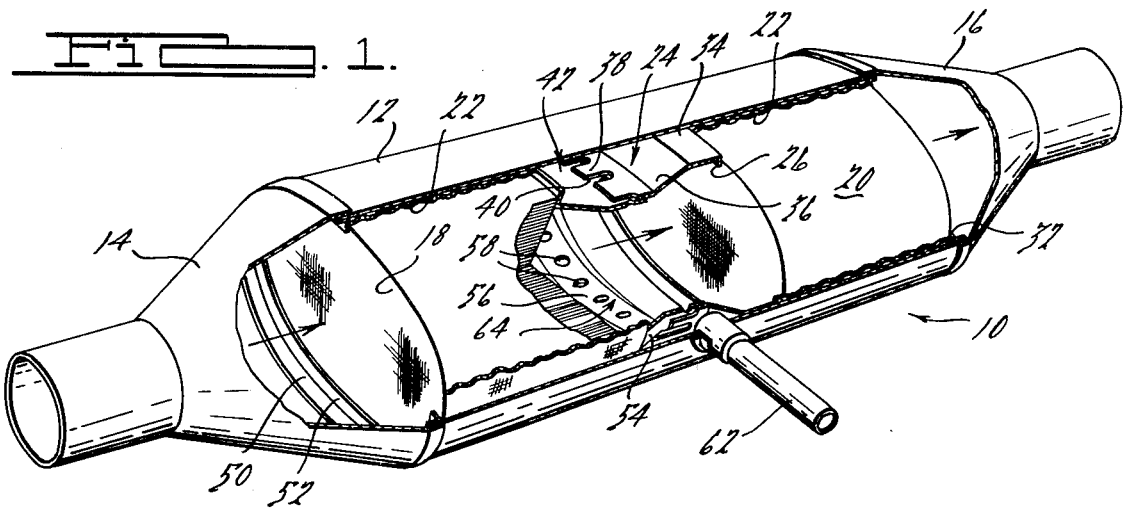
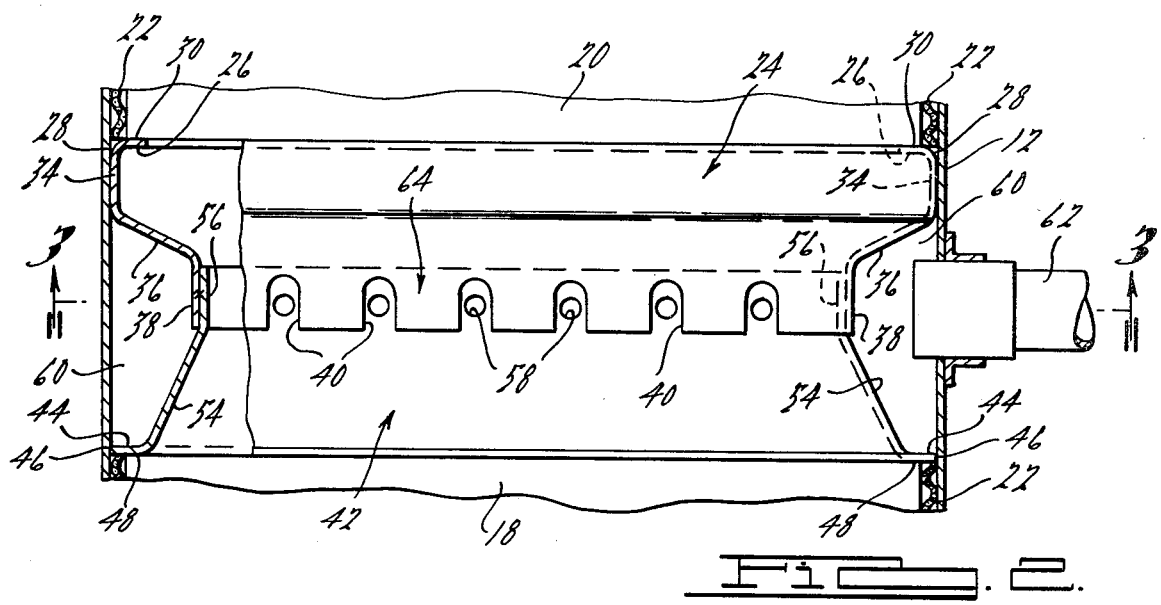
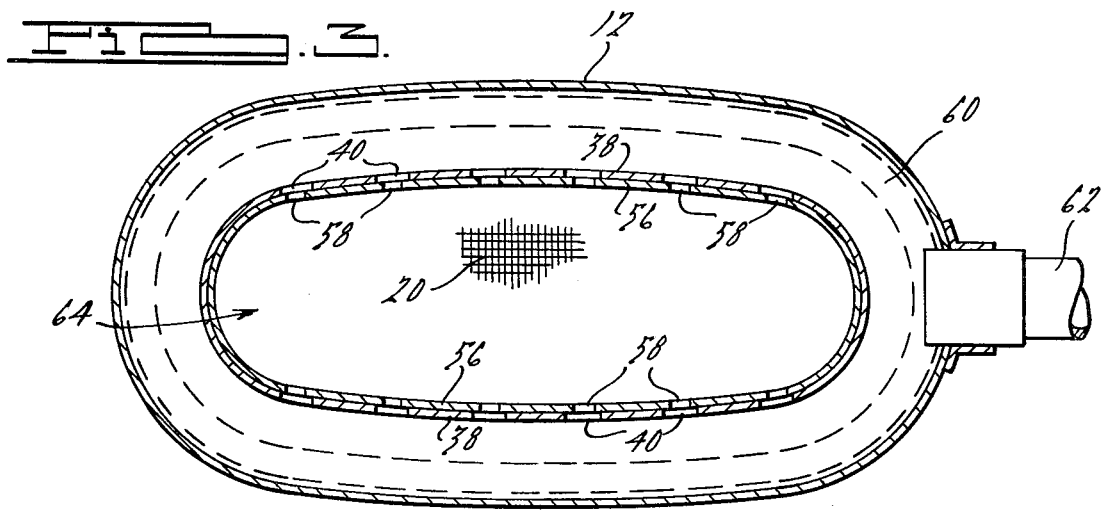

CONVERTER STRUCTURE

BACKGROUND OF THE INVENTION

The automotive industry is developing catalytic converters for treating exhaust gases developed in an internal combustion engine. Some newer forms of these catalyst converters include a pair of spaced apart catalyst beds. The first bed in the catalyst converter is a three-way catalytic converter which simultaneously treats oxides of nitrogen, carbon monoxide and unburned hydrocarbons. Generally, the gases flowing across this bed are derived from an engine operating near or at a stoichiometric air to fuel ratio so that the resulting exhaust gases have an overall reducing potential. The reducing potential is favored over the three-way catalyst in order to eliminate oxides of nitrogen. The second catalyst bed in the converter is an oxidation catalyst bed for eliminating any unburned hydrocarbons or carbon monoxide remaining in the exhaust gas stream. Such a catalyst bed is best operated under oxidizing conditions. Therefore, it is necessary to introduce secondary air to the exhaust gas stream after it has passed through the first three-way catalyst and prior to its passage over the oxidation catalyst. Primary air is the air which is mixed with the fuel which is burned in the internal combustion engine.

It is a principal object of this invention to provide a secondary air introduction system between the three-way catalyst and the oxidation catalyst which is extremely efficient in operation but yet of simple and practical design.

A novelty study conducted on the subject matter of this application resulted in the citation of the following U.S. Pat. Nos. 3,061,416; 3,413,096; 3,656,915; 3,719,457; 3,773,894 and 3,813,226.

SUMMARY OF THE INVENTION

This invention relates to a converter structure and, more particularly, to an improved device for introducing secondary air in a catalyst converter.

This invention is directed to an improved device for a catalyst converter structure which includes a converter housing having inlet and outlet structures attached to opposite ends thereof. The converter structure also contains a pair of catalyst containing beds supported therein in spaced relationship from one another. The improved device of this invention is for the purpose of introducing secondary air between the spaced catalyst containing beds. In general, the device of this invention includes structure located in the space between the catalyst containing beds which forms a restricted throat between the spaced catalyst containing beds and an annular zone between the structure and the interior surface of the converter housing, which annular zone encircles the restricted throat. The structure defining the annular zone and restricted throat also includes openings between the annular zone and the restricted throat. A source of secondary air supplies secondary air initially to the annular zone, which air can flow through the openings to the restricted throat to mix with the exhaust gases which have passed over the first catalyst containing beds prior to passage of the gases and secondary air over the second of the catalyst containing beds.

BRIEF DESCRIPTION OF THE DRAWINGS

FIG. 1 is a perspective view of a catalyst converter, partly in cross section, showing the improved device for introducing secondary air in accordance with the teachings of this invention.

FIG. 2 is a plan view, partly in cross section, of the improved device for introducing secondary air.

FIG. 3 is an elevational view, in cross section, taken along line 3—3 of FIG. 2.

DESCRIPTION OF THE PREFERRED EMBODIMENT

Construction

In FIG. 1 there is seen a catalytic converter generally identified by the numeral 10. The converter includes a converter housing 12 with an inlet structure 14 and an outlet structure 16 bonded to opposite ends thereof. The housing and inlet and outlet structures are formed from suitable iron alloys known in the art which are capable of withstanding high temperature exhaust gases. The flow of gases from an internal combustion engine (not shown) through the catalytic converter is shown by the arrows in FIG. 1.

The catalytic converter 10 contains a pair of catalyst containing substrates 18 and 20. The substrates shown in the preferred embodiment are of the monolythic type well known in the art. These substrates are supported within the converter housing 12 by means of a wire mesh material 22 also well known in the art.

The first catalyst containing substrate 18 contains a catalyst for carrying out a three-way catalytic operation. By this it is meant that the first catalyst containing substrate is effective in treating oxides of nitrogen, unburned hydrocarbons and carbon monoxide contained in the exhaust gas stream from the internal combustion engine. All three of these materials are simultaneously removed from the gas stream with the most efficient removal being that of oxides of nitrogen.

In order to remove oxides of nitrogen, the gas stream flowing over the substrate must be generally reducing in overall composition. If too much oxygen is present, it will preferentially react with unburned hydrocarbons and carbon monoxide and the carbon monoxide will not, therefore, be available to aid in the reduction of oxides of nitrogen. Therefore, the internal combustion engine associated with the catalytic converter 10 is run as near stoichiometric conditions as is possible so that the exhaust gas stream does not contain excess oxygen. As stated previously, this first catalyst containing substrate is designed to remove oxides of nitrogen while it does also aid in reducing some of the unburned hydrocarbons as well as carbon monoxide.

The second catalyst containing substrate 20 is designed to remove the unburned hydrocarbons and carbon monoxide not eliminated by first catalyst containing substrate 18. However, this catalyst substrate operates better under oxidizing conditions where more oxygen is available than is needed to eliminate all of the unburned hydrocarbons and carbon monoxide.

The device of this invention is a structure for introducing secondary air into the space between the first catalyst containing substrate 18 and the second catalyst containing substrate 20 so that the second substrate may operate under oxidizing condictions. This introduced air is called secondary air because the primary air is that which is supplied to carry the fuel into the chambers of the engine.

The device of this invention is best understood by studying FIGS. 1 through 3 of the drawings. The device includes a first member, generally identified by the numeral 24. The first member has a lip portion 26 whose outer edge 28 engages along its entire periphery a cross section of the interior of the converter housing 12. The lip portion 26 has a face 30 which engages a front face of the second catalyst containing substrate 20. A similar lip 32 (FIG. 1) formed on a ring member welded at the rear end of the converter housing 12 engages a back face of the catalyst containing substrate 20 thereby blocking the flow of gaseous material into the area where the wire mesh 22 resiliently supports the substrate within the container.

The first member 24 also has a gas sealing portion 34 which extends from the lip portion 26 away from the second catalyst containing substrate 20. This gas sealing portion 34 is in contact with the interior surface of the converter housing 12 along its entire periphery.

The first member 24 also has a gradually tapered portion 36 extending from the gas sealing portion 34 away from the second catalyst containing substrate 20. The gradually tapered portion 36 tapers inwardly away from the interior surface of the converter housing 12 as this surface moves away from the second catalyst substrate.

The first member 24 also has a flange portion 38. This flange portion 38 extends from the gradually tapered portion 36 generally away from the second substrate 20. This flange portion 38 also has a plurality of openings 40 therein. These openings are in the form of slots.

The device for feeding secondary air to the catalytic converter 10 also includes a second member generally identified by the numeral 42. This second member has a lip portion 44 whose outer edge 46 engages along its entire periphery a cross section of the converter housing's 12 interior. The lip portion 44 also has a face 48 engaging a rear face of the first catalyst containing substrate 18. As is best seen in FIG. 1, a ring member 50 provides an upstanding face member 52 which engages the front face of the first catalyst containing substrate 18 to block flow of gases into the wire mesh material 22 resiliently supporting the first catalyst containing substrate in the converter 10.

The second member 42 also has a gradually tapered portion 54 extending away from the lip portion 44 in a direction away from the first catalyst containing substrate 18. This gradually tapered portion tapers inwardly from the interior surface of the converter housing 12 as it moves away from the first substrate.

The second member 42 also has a flange portion 56 extending from the gradually tapered portion 54 generally away from the first catalyst containing substrate 18. This flange portion 56 has a plurality of openings 58 therein. The flange portion 56 of the second member 42 fits internally of the flange portion 38 of the first member 24. The two flanges are bonded together so as to form a gas seal therebetween. The openings 40 in the flange portion 38 of the first member 24 are aligned with the openings 58 of the flange portion 56 of the second member 42.

The construction in the drawings produces a device in which the first and second members 24 and 42 together define an annular exterior zone 60 between the gradually tapered surfaces of these members and the internal wall of the converter housing 12. Secondary air is delivered through a tube 62 to this annular exterior zone for use in the catalytic coverter 10. The air is supplied to the tube by a suitable air pump (not shown) of known construction. The first and second members 24 and 42, when assembled, also define a restricted throat generally identified by the numeral 64. The annular exterior zone 60 is connected to the restricted throat 64 by means of the aligned openings 40 and 58 respectively contained in the flange portions 38 and 56 of the first and second members 24 and 42.

Operation

In operation, this catalyst converter 10 is employed to treat exhaust gases delivered to it from an internal combustion engine. The gases flow into the inlet structure 14 and are delivered to the first catalyst containing substrate 18. These gases are reducing in nature and when they pass over the first catalyst substrate oxides of nitrogen, unburned hydrocarbons and carbon monoxide are removed therefrom, the removal of unburned hydrocarbons and carbon monoxide generally not being complete. The gases then pass into the space between the two catalyst converters and flow through the restricted throat 64 defined by the members 24 and 42. By flowing through the restricted throat, the velocity of the gases is increased thus causing turbulence and mixing. Secondary air supplied through the tube 60 is delivered to the annular exterior zone 60 and then through the openings to the restricted throat at which point they can be mixed thoroughly with the exhaust gases. The thoroughly mixed gases are then passed through the second catalyst substrate 20 to carry out the remainder of the oxidation of the unburned hydrocarbons and carbon monoxide. The treated gases are then passed through the outlet structure 16 for delivery to the atmosphere.

Besides providing secondary air and turbulent mixing of the secondary air and exhaust gases, the device of this invention has another important facet in that the secondary air passing into the annular exterior zone picks up any heat which is lost from the interior mixing zone and carries it back into that mixing zone when the secondary air flows therein. Thus, the secondary air in the annular exterior zone acts as an insulating system to retain the heat in that zone intermediate the two catalyst containing substrates. The retention of this heat is of importance in order to sustain the temperature of operation of the oxidation catalyst at a high level where it is more efficient.

There has been disclosed herein an improved catalyst container structure. Those skilled in the art will have many modifications thereof which fall within the true spirit and scope of the invention. It is intended that all such modifications be included within the scope of the appended claims.

What we claim is:

1. In a catalytic converter for combustion product comprising a shell defining first and second longitudinally spaced apart shell portions, said shell having an interior wall, a first substrate containing a reducing catalyst, the first substrate disposed in the first shell portion, a second substrate containing an oxidizing catalyst, the second substrate disposed in the second shell portion, said shell further having an inlet for introducing combustion product into the first shell portion and an outlet for exhausting combustion product from the second shell portion, and a third passageway providing communication between the first and second shell portions, means for introducing air into the combustion product flowing longitudinally through the third passageway and means for providing access to the air introducing means through the shell, the improvement wherein the air introducing means comprises at least one channel section, the at least one channel section being formed to extend perimetrally substantially completely about the interior wall of the shell generally transversely to combustion product flow through the third passageway, the at least one channel section including upstream and downstream edge portions for engaging the interior wall of the shell and an intermediate portion extending between the upstream and downstream edge portions for defining between the channel section and the shell interior wall a manifold, said manifold including a plurality of apertures opening inwardly for directing a plurality of streams containing air from the manifold into the combustion product.

2. The improvement of claim 1 wherein the apertures direct air containing streams generally perpendicularly of the direction of combustion product flow in the third passageway.

* * * * *